US012761090B2

(12) United States Patent
Tsai et al.

(10) Patent No.: US 12,761,090 B2
(45) Date of Patent: Oct. 13, 2026

(54) HYBRID SENSOR WITH VOTING LOGIC FOR INTENT VALIDATION

(71) Applicant: NextInput, Inc., Mountain View, CA (US)

(72) Inventors: Julius Minglin Tsai, San Jose, CA (US); Ali Foughi, Atherton, CA (US)

(73) Assignee: NextInput, Inc., Mountain View, CA (US)

( * ) Notice: Subject to any disclaimer, the term of this patent is extended or adjusted under 35 U.S.C. 154(b) by 413 days.

(21) Appl. No.: 18/274,127

(22) PCT Filed: Jan. 31, 2022

(86) PCT No.: PCT/US2022/014519
§ 371 (c)(1),
(2) Date: Jul. 25, 2023

(87) PCT Pub. No.: WO2022/165312
PCT Pub. Date: Aug. 4, 2022

(65) Prior Publication Data

US 2024/0418583 A1 Dec. 19, 2024

Related U.S. Application Data

(60) Provisional application No. 63/143,462, filed on Jan. 29, 2021.

(51) Int. Cl.
*G01L 1/16* (2006.01)
*G01J 5/10* (2006.01)
*G01L 1/18* (2006.01)

(52) U.S. Cl.
CPC .................................... *G01L 1/16* (2013.01); *G01J 5/10* (2013.01); *G01L 1/18* (2013.01)

(58) Field of Classification Search
CPC .......... G01L 1/18; G01L 1/16; G06F 3/04182
See application file for complete search history.

(56) References Cited

U.S. PATENT DOCUMENTS 1,023,500 A 4/1912 Bogen
3,822,587 A 7/1974 Makino et al.
(Continued)

FOREIGN PATENT DOCUMENTS

CN 110560350 A 12/2019
CN 112871612 A 6/2021
(Continued)

OTHER PUBLICATIONS

Partial European Search Report for European Patent Application No. 23158244.6, mailed Jul. 26, 2023, 16 pages.
(Continued)

*Primary Examiner* — Tran M. Tran
(74) *Attorney, Agent, or Firm* — Withrow & Terranova, P.L.L.C.

(57) ABSTRACT

A hybrid sensor device includes a substrate; a first sensing element configured to sense force; a second sensing element configured to sense at least one of light intensity, acoustic impedance, electrical conductivity, electrical permittivity, or temperature; signal processing circuitry configured to receive and process respective output signals of the first and second sensing elements; and decision logic circuitry configured to validate an intent of a user input based on the respective output signals of the first and second force sensors, wherein the first and second sensors, the signal processing circuitry, and the decision logic circuitry are integrated on the substrate.

16 Claims, 4 Drawing Sheets

(56) References Cited

U.S. PATENT DOCUMENTS

| | | | |
|---|---|---|---|
| 3,975,948 | A | 8/1976 | Makino et al. |
| 4,634,982 | A | 1/1987 | Pungor et al. |
| 4,964,302 | A | 10/1990 | Grahn et al. |
| 5,209,126 | A | 5/1993 | Grahn |
| 5,673,041 | A | 9/1997 | Chatigny et al. |
| 9,097,600 | B2 * | 8/2015 | Khandani ............. G01L 1/2256 |
| 9,244,116 | B2 * | 1/2016 | Kabler ................. G01R 35/005 |
| 9,494,544 | B2 | 11/2016 | Hayakawa et al. |
| 9,618,405 | B2 | 4/2017 | Liu et al. |
| 9,959,750 | B2 * | 5/2018 | Lee .......................... H04B 7/26 |
| 10,452,215 | B2 * | 10/2019 | Chang ..................... G01L 1/146 |
| 10,573,289 | B2 | 2/2020 | Przybyla et al. |
| 10,632,500 | B2 | 4/2020 | Berger et al. |
| 11,087,109 | B1 * | 8/2021 | Strohmann ........ G06V 40/1306 |
| 11,263,424 | B2 | 3/2022 | Tsai et al. |
| 11,423,686 | B2 | 8/2022 | Tsai et al. |
| 11,507,230 | B2 | 11/2022 | Jung |
| 11,604,104 | B2 | 3/2023 | Tsai et al. |
| 11,642,539 | B2 * | 5/2023 | Clark ................... A61B 5/4836 607/5 |
| 11,663,992 | B2 | 5/2023 | Canberk et al. |
| 11,946,817 | B2 * | 4/2024 | Foughi ...................... B81B 7/02 |
| 12,022,737 | B2 | 6/2024 | Tang et al. |
| 12,066,338 | B2 | 8/2024 | Akhbari et al. |
| 2001/0031922 | A1 | 10/2001 | Weng et al. |
| 2003/0164820 | A1 | 9/2003 | Kent |
| 2004/0236223 | A1 | 11/2004 | Barnes et al. |
| 2005/0083313 | A1 | 4/2005 | Hardie-Bick |
| 2006/0004290 | A1 | 1/2006 | Smith et al. |
| 2007/0085690 | A1 | 4/2007 | Tran |
| 2007/0091063 | A1 | 4/2007 | Nakamura |
| 2007/0236450 | A1 | 10/2007 | Colgate et al. |
| 2007/0273504 | A1 | 11/2007 | Tran |
| 2009/0160781 | A1 | 6/2009 | Henderson et al. |
| 2009/0274357 | A1 | 11/2009 | Wilson et al. |
| 2010/0231367 | A1 | 9/2010 | Cruz-Hernandez et al. |
| 2010/0296692 | A1 | 11/2010 | Reiche |
| 2011/0254762 | A1 | 10/2011 | Dahl et al. |
| 2011/0285618 | A1 | 11/2011 | Browne et al. |
| 2012/0111119 | A1 | 5/2012 | Small et al. |
| 2012/0165669 | A1 | 6/2012 | Barley et al. |
| 2012/0188066 | A1 | 7/2012 | Ujii et al. |
| 2012/0274609 | A1 | 11/2012 | Sheng et al. |
| 2012/0286847 | A1 | 11/2012 | Peshkin et al. |
| 2013/0303920 | A1 | 11/2013 | Corl |
| 2013/0321262 | A1 | 12/2013 | Schecter |
| 2013/0328835 | A1 | 12/2013 | Ahn |
| 2014/0022189 | A1 | 1/2014 | Sheng et al. |
| 2014/0043295 | A1 | 2/2014 | Alameh et al. |
| 2014/0055407 | A1 | 2/2014 | Lee et al. |
| 2014/0090489 | A1 | 4/2014 | Taylor |
| 2014/0210490 | A1 | 7/2014 | Hayakawa et al. |
| 2014/0247230 | A1 | 9/2014 | Sheng et al. |
| 2014/0267013 | A1 | 9/2014 | Grant et al. |
| 2014/0320393 | A1 | 10/2014 | Modarres et al. |
| 2014/0354596 | A1 | 12/2014 | Djordjev et al. |
| 2015/0074615 | A1 | 3/2015 | Han et al. |
| 2015/0097814 | A1 | 4/2015 | Lynn et al. |
| 2015/0135108 | A1 | 5/2015 | Pope et al. |
| 2015/0138112 | A1 | 5/2015 | Campbell et al. |
| 2015/0357375 | A1 | 12/2015 | Tsai et al. |
| 2016/0041047 | A1 | 2/2016 | Liu et al. |
| 2016/0054826 | A1 | 2/2016 | Huppi et al. |
| 2016/0058519 | A1 | 3/2016 | Herr |
| 2016/0062497 | A1 | 3/2016 | Huppi et al. |
| 2016/0062498 | A1 | 3/2016 | Huppi et al. |
| 2016/0062530 | A1 | 3/2016 | Huppi et al. |
| 2016/0070404 | A1 | 3/2016 | Kerr et al. |
| 2016/0183915 | A1 | 6/2016 | Govari et al. |
| 2016/0246396 | A1 | 8/2016 | Dickinson et al. |
| 2016/0370893 | A1 | 12/2016 | Sheng et al. |
| 2017/0083164 | A1 | 3/2017 | Sheng et al. |
| 2017/0228072 | A1 | 8/2017 | Amin et al. |
| 2017/0255338 | A1 | 9/2017 | Medina et al. |
| 2017/0285810 | A1 | 10/2017 | Krah |
| 2017/0285848 | A1 | 10/2017 | Rosenberg et al. |
| 2018/0067554 | A1 | 3/2018 | Chaudhri et al. |
| 2018/0067596 | A1 | 3/2018 | Wells et al. |
| 2018/0099414 | A1 | 4/2018 | Chuang et al. |
| 2018/0101711 | A1 | 4/2018 | D'Souza et al. |
| 2018/0107854 | A1 | 4/2018 | Tsai et al. |
| 2018/0129355 | A1 | 5/2018 | Lynn et al. |
| 2018/0164937 | A1 | 6/2018 | Lynn et al. |
| 2018/0246612 | A1 | 8/2018 | Lynn et al. |
| 2018/0335936 | A1 | 11/2018 | Missig et al. |
| 2018/0364850 | A1 | 12/2018 | Vosgueritchian et al. |
| 2018/0369866 | A1 | 12/2018 | Sammoura et al. |
| 2019/0012040 | A1 | 1/2019 | Lynn et al. |
| 2019/0073064 | A1 | 3/2019 | Sheng et al. |
| 2019/0080066 | A1 | 3/2019 | Van Os et al. |
| 2019/0141456 | A1 | 5/2019 | Dogiamis et al. |
| 2019/0354238 | A1 | 11/2019 | Akhbari et al. |
| 2019/0383675 | A1 * | 12/2019 | Tsai ....................... H10N 39/00 |
| 2020/0257875 | A1 | 8/2020 | Hall et al. |
| 2020/0357379 | A1 | 11/2020 | Garlepp et al. |
| 2020/0378845 | A1 * | 12/2020 | Bergemont ............... G01L 1/18 |
| 2021/0286060 | A1 | 9/2021 | Jennings et al. |
| 2021/0293648 | A1 | 9/2021 | Tu et al. |
| 2021/0401404 | A1 | 12/2021 | Hageman et al. |
| 2023/0266183 | A1 * | 8/2023 | Tsai ..................... H10N 30/071 310/334 |
| 2025/0281763 | A1 * | 9/2025 | Clark ................... A61N 1/3987 |

FOREIGN PATENT DOCUMENTS

| | | | | |
|---|---|---|---|---|
| WO | WO-2019023309 | A1 * | 1/2019 | ............. G06F 3/041 |
| WO | 19152961 | A1 | 8/2019 | |
| WO | 2021033030 | A1 | 2/2021 | |
| WO | 2022026046 | A1 | 2/2022 | |

OTHER PUBLICATIONS

Extended European Search Report for European Patent Application 23158244.6, mailed Nov. 20, 2023, 19 pages.

Clarke, P., "Ultrasound for HMI on intelligent personal assistants," eeNews Europe, Mar. 14, 2017, available from the Internet: [URL: https://www.eenewseurope.com/en/ultrasound-for-hmi-on-intelligent-personal assistants/], 2 pages.

Owano, N., "Apple patent talk: Ultrasound-based force and touch sensing," Tech Xplore, Sep. 28, 2017, available from the Internet: [URL: https://techxplore.com/news/2017-09-apple-patent-ultrasound-based.html], 3 pages.

Sentons, "Technology," available as early as Oct. 2019 from the Internet: [URL: https://www.sentons.com/technology/], 3 pages.

International Search Report and Written Opinion for International Patent Application No. PCT/US2022/014519, mailed May 4, 2022, 14 pages.

* cited by examiner

HYBRID SENSOR WITH VOTING LOGIC FOR INTENT VALIDATION

CROSS-REFERENCE TO RELATE APPLICATIONS

The present application is a 35 USC 371 national phase filing of International Application No. PCT/US2022/014519, filed Jan. 31, 2022, which claims priority to U.S. Provisional Patent Application No. 63/143,462, filed Jan. 29 2021, the disclosures of which are incorporated herein by reference in their entireties

BACKGROUND

The present disclosure generally relates to a hybrid sensor capable of measuring multiple physical parameters to validate the intent of a user interaction. Specifically, the hybrid sensor described herein may sense both a force and at least one second physical parameter, such as light intensity, acoustic impedance, electrical conductivity, or electrical permittivity.

Capacitive touch sensing has become an increasingly common method of receiving user inputs to a human-machine interface (HMI). Over time, industrial design innovations have proliferated into seamless touch surfaces for devices such as smartphones, smartwatches, automotive steering wheels and dash boards, true wireless stereo (TWS) earbuds, and the like. In these and other types of devices, traditional mechanical buttons may be replaced with seamless touch surfaces for receiving user inputs to control said devices. For example, traditional mechanical buttons may be replaced with virtual buttons displayed on an HMI.

However, commonly used capacitive touch sensing sensors and methods are often incapable of sensing and/or interpreting a level of force applied (e.g., which may be indicative of intent) by a user input (e.g., a touch on an HMI). In contrast, commonly used force sensors may sense and/or interpret the level of an applied force by a user on an HMI but may not accurately determine the location of the touch. Further, in instances where a user applies a significant amount of force (e.g., over a threshold level), these commonly used force sensors may trigger a false positive by registering a touch on an incorrect area of the HMI.

SUMMARY

One implementation of the present disclosure is a hybrid sensor device having a substrate; a first sensing element configured to sense an applied force; a second sensing element configured to sense at least one of light intensity, acoustic impedance, electrical conductivity, electrical permittivity, or temperature; signal processing circuitry configured to receive and process respective output signals of the first and second sensing elements; and decision logic circuitry configured to validate an intent of a user input based on the respective output signals of the first and second force sensors, wherein the first and second sensors, the signal processing circuitry, and the decision logic circuitry are integrated on the substrate.

In some embodiments, the second sensing element is a light sensor.

In some embodiments, the light sensor is configured to measure the intensity of near-infrared light.

In some embodiments, the second sensing element is configured to measure the ultrasonic acoustic impedance.

In some embodiments, the second sensing element is configured to measure at least one of electrical conductivity or electrical permittivity using capacitance.

In some embodiments, the first sensing element is at least one of a piezoelectric sensor, a piezoresistive sensor, or a capacitive sensor.

In some embodiments, the hybrid sensor device is implemented as a wafer level chip scale package (WLCSP).

In some embodiments, the hybrid sensor device further includes at least one of a plurality of solder bumps or a plurality of copper pillars protruding from the substrate for electrically and mechanically coupling the hybrid sensor device to a printed circuit board.

In some embodiments, the hybrid sensor device is implemented as a quad-flat no-leads (QFN) package.

In some embodiments, the hybrid sensor device further includes a metal lead frame, the substrate being disposed on the metal lead frame and the substrate and the metal lead frame electrically coupled using a bond wire.

In some embodiments, the hybrid sensor device further includes a sealed cavity formed in the substrate to provide flexural and overload protection.

In some embodiments, the hybrid sensor device further includes an acoustic actuator layer formed on top of the substrate.

In some embodiments, the hybrid sensor device further includes a metallic layer positioned between the acoustic actuator layer and the substrate, the acoustic actuator layer and the substrate electrically coupled through the metallic layer.

In some embodiments, the acoustic actuator layer is electrically coupled to the substrate through a bond wire.

In some embodiments, the acoustic actuator layer is smaller in surface area than the substrate.

In some embodiments, the acoustic actuator layer is equivalent in surface area to the substrate.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, a hybrid sensor is shown that is capable of sensing both a location (e.g., capacitive sensing) and an intent (e.g., force sensing) of a user input (e.g., touch). In particular, the hybrid sensor may include two sensing elements: a first sensing element for sensing the force of a touch and a second sensing element for measuring another physical parameter, such as light intensity, acoustic impedance, electrical conductivity, or electrical permittivity. The hybrid sensor may also include processing circuitry and/or decision (i.e., voting) logic that can interpret electrical signals from the first and second sensing elements. Once processed by the processing circuitry, for example, an electrical signal from the second sensing element may be used to validate a force registered by the first sensing element.

In this manner, the hybrid sensor described herein may address many of the shortcomings described above with respect to more traditional capacitive and force sensors. For example, the rate of false positives due to extremely small input (e.g., touch) forces may be mitigated by validating a sensed force using the second sensing element. Furthermore, unlike many other types of capacitive and/or force sensors, the first sensing element, second sensing element, processing circuitry, and decision logic of the hybrid sensor described herein may be integrated into a single chip (e.g., silicon chip), which provides improved sensing capabilities over other devices in a small, energy efficient package. As described in greater detail below, these hybrid sensors may also be manufactured for a low cost in wafer level chip scale package (WLCSP) or quad-flat no-leads (QFN) forms, which can lower the threshold for technology proliferation. Accordingly, the hybrid sensor described herein may be a low-cost and easily-implemented replacement for mechanical button and other sensing devices in a variety of materials and surfaces.

Figure 1:
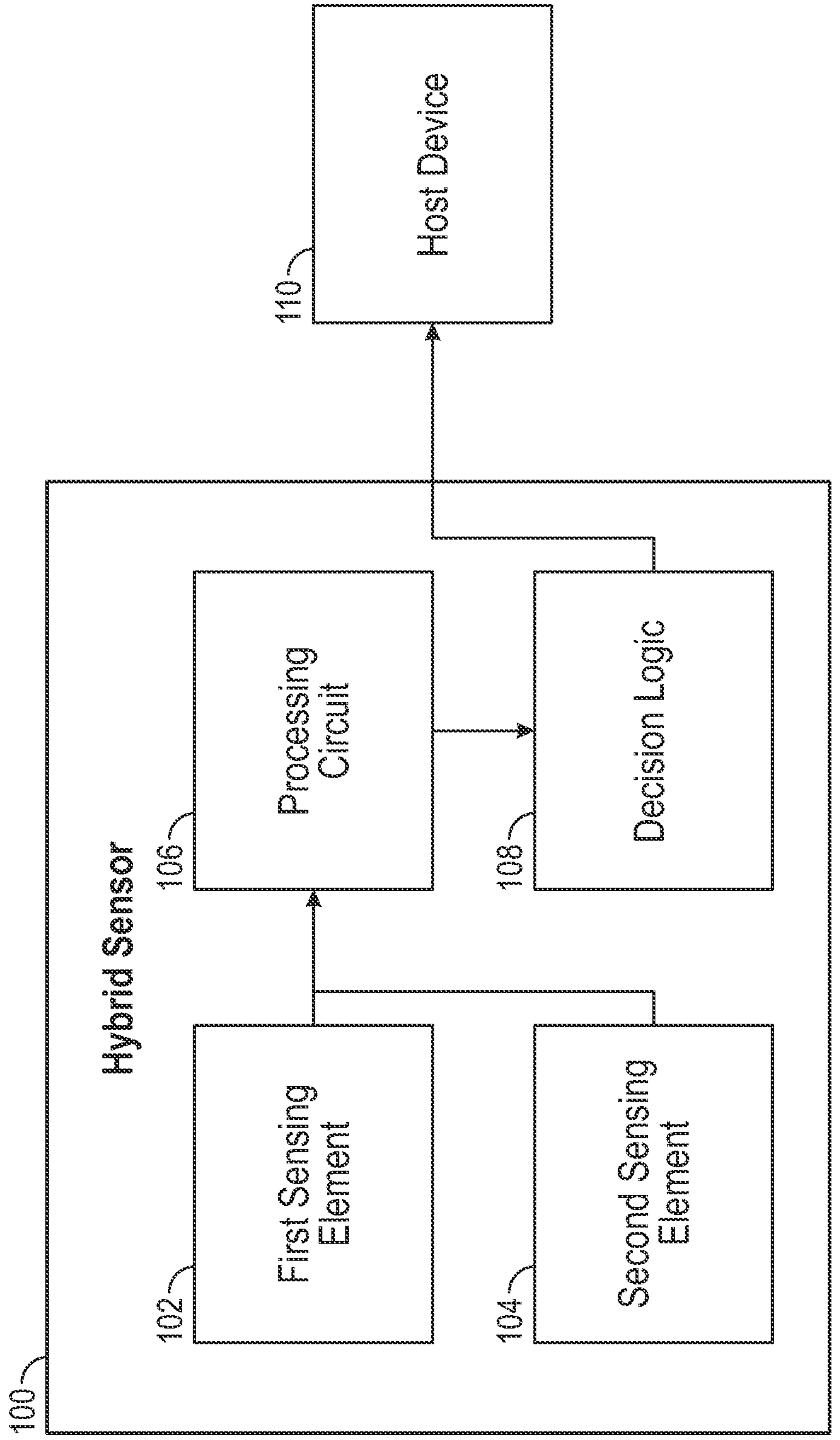
FIG. 1 is a block diagram of a hybrid voting sensor system, according to some embodiments.

Turning first to FIG. 1, a block diagram of a hybrid sensor 100 is shown, according to some embodiments. Generally, hybrid sensor 100 may be configured to sense both a location (e.g., capacitive sensing) and an intent (e.g., force sensing) of a user input (e.g., touch), as briefly described above. In this regard, hybrid sensor 100 is shown to include a first sensing element 102, also referred to herein as a first sensor (i.e., transducer), that is capable of sensing an applied force (e.g., due to an input, such as a touch, from a user). In some embodiments, first sensing element 102 is a piezoelectric sensor. In such embodiments, first sensing element 102 may be formed of one or more piezoelectric materials (e.g., any type of piezoelectric crystal) that produce an electrical charge from a mechanical stressor (i.e., mechanical strain), such as a touch or press of a user. In some such embodiments, first sensing element 102 can be formed from at least one of aluminum nitride (AlN), zinc oxide (ZnO), lead zirconate titanate (PZT), lithium niobate (LiNbO3), barium titanate (BaTiO3), sodium potassium niobate (KNN), or polyvinylidene fluoride (PVDF), or any other suitable piezoelectric material. When a force is applied to hybrid sensor 100, a mechanical strain is transferred to first sensing element 102, which converts the strain into charge. In other words, first sensing element 102 can change an electrical characteristic (e.g., charge) in response to deflection of a portion of hybrid sensor 100. Piezoelectric sensors (e.g., transducers) are known in the art and therefore not described in further detail herein.

In other embodiments, first sensing element 102 is a piezoresistive sensor. Accordingly, first sensing element 102 may be formed of one or more piezoresistive materials that, when placed under a mechanical strain, change in electrical resistivity. For example, when a mechanical strain is induced on hybrid sensor 100, a localized strain is imparted on first sensing element 102. As first sensing element 102 compresses and tenses, its resistivity changes. Piezoresistive sensors (e.g., transducers) are known in the art and therefore not described in further detail herein. In yet other embodiments, first sensing element 102 is a capacitive sensor. In such embodiments, first sensing element 102 may be formed of a material whose capacitance changes responsive to a mechanical force (e.g., strain), such as due to a touch from a user. Accordingly, the capacitance of first sensing element 102 may be measured to determine the applied force. Capacitive sensors (e.g., transducers) are known in the art and therefore not described in further detail herein. Optionally, in some implementations, this disclosure contemplates that the hybrid sensor 100 may include a plurality of first sensing elements 102 (e.g., a plurality of piezoelectric, piezoresistive, or capacitive sensors).

Hybrid sensor 100 is also shown to include a second sensing element 104 for measuring at least one additional physical parameter related to a user input. Specifically, in some embodiments, second sensing element 104 may be configured to measure at least one of light intensity, acoustic impedance, electrical conductivity, or electrical permittivity, as it will be appreciated that one or more of these physical parameters may be affected by the presence of the user. For example, a touch from a user's finger may cause a change in electrical permittivity or electrical conductivity near hybrid sensor 100 or may reduce the intensity of light or sound near hybrid sensor 100. Accordingly, in some embodiments, second sensing element 104 may be an infrared sensor configured to measure the intensity of near-infrared light (e.g., electromagnetic waves having a wavelength ranging from 780 nm to 2500 nm). In some embodiments, second sensing element 104 is an acoustic sensor configured to measure ultrasonic acoustic impedance. As described herein, ultrasonic acoustic impedance may be the resistance to the propagation of ultrasonic sound waves (e.g., sound waves above 20 kHz). In some embodiments, second sensing element 104 is configured to measure at least one of electrical conductivity or electrical permittivity based on capacitance. In other words, second sensing element 104 may be a capacitance or dielectric sensor that measures dielectric permittivity.

Hybrid sensor 100 is also shown to include a processing circuit 106 configured to process the electrical signals received from one or both of first sensing element 102 and second sensing element 104. In some embodiments, processing circuit 106 includes digital circuitry (i.e., one or more digital components) for converting analog electrical signals received from first sensing element 102 and second sensing element 104 into digital signals. For example, processing circuit 106 may include one or more of a differential amplifier or buffer, an analog-to-digital (ADC) converter, a clock generator, non-volatile memory, a communication bus, and the like for converting analog signals to digital signals.

Subsequently, the processed (e.g., digital) signals may be passed (i.e., transmitted) to a decision logic 108 for validation. For example, processing circuit 106 may transmit the processed signals from first sensing element 102 and second sensing element 104 as discrete voltage levels (e.g., 0V and 5V) corresponding to a binary value, as interpreted by decision logic 108. Decision logic 108 may include one or more digital and/or analog components for comparing the processed signals from first sensing element 102 and second sensing element 104 in order to validate the intent of a user input (e.g., touch). Accordingly, decision logic 108 may compare the values (i.e., processed signals) from each of first sensing element 102 and second sensing element 104 to determine whether a user input is valid. In some embodiments, a mismatch between the values of first sensing element 102 and second sensing element 104 may indicate that the user input was not valid while a match between the values of first sensing element 102 and second sensing element 104 may include that the user input was valid.

As an example, responsive to a user input (e.g., a touch on a touchscreen of a device containing one or more of hybrid sensor 100), first sensing element 102 may sense a force of the user input and second sensing element 104 may sense at least one other parameter (e.g., light intensity, acoustic impedance, electrical conductivity, electrical permittivity, etc.) corresponding to the user input. Subsequently, first sensing element 102 and second sensing element 104 may output analog signals to processing circuit 106 which may process the analog signals to generate corresponding digital outputs (e.g., discrete voltages, binary values, etc.). These digital outputs may then be compared by decision logic 108 to determine whether the user input is valid.

In some implementations, respective digital outputs associated with the first and second sensors 102 and 104 are compared by decision logic 108 to respective thresholds, which may be different. For example, if each respective digital output exceeds its respective threshold, then the user input is optionally determined valid. On the other hand, if each respective digital output is less than its respective threshold, then the user input is optionally determined invalid. In these implementations, decision logic 104 implements an AND gate. In other implementations, a respective digital output associated with the first sensor 102 is compared by decision logic 108 to a plurality of respective thresholds associated with first sensor 102, and a respective digital output associated with the second sensor 104 is compared by decision logic 108 to a plurality of respective thresholds associated with second sensor 104. In these implementations, the user input is optionally determined valid/invalid by decision logic 108, for example, using a logic table based on various combinations from the comparisons.

As described herein, a valid user input may indicate that the user did, in fact, provide an input at or near hybrid sensor 100, while an invalid input may indicate that the user did not provide an input. Accordingly, a discrepancy between the digital outputs corresponding to first sensing element 102 and second sensing element 104 (e.g., where first sensing element 102 senses a force and second sensing element 104 does not measure a change in a second physical parameter) may indicate that an input is invalid.

Once the user input is validated, hybrid sensor 100 may transmit a signal (e.g., indicating a validated intent) to a host device 110. In some embodiments, host device 110 is a microcontroller (μC) for an embedded system, a processor (e.g., of a smartphone), a bridge controller integrated circuit (IC) (e.g., for a computer), or the like. More generally, host device 110 may be any device that is capable of receive an indication (e.g., a digital signal) of a validated user input from hybrid sensor 100. In some embodiments, host device 110 may be a μC, IC, or other processing component(s) disposed on the same circuit board as hybrid sensor 100.

Figure 2:
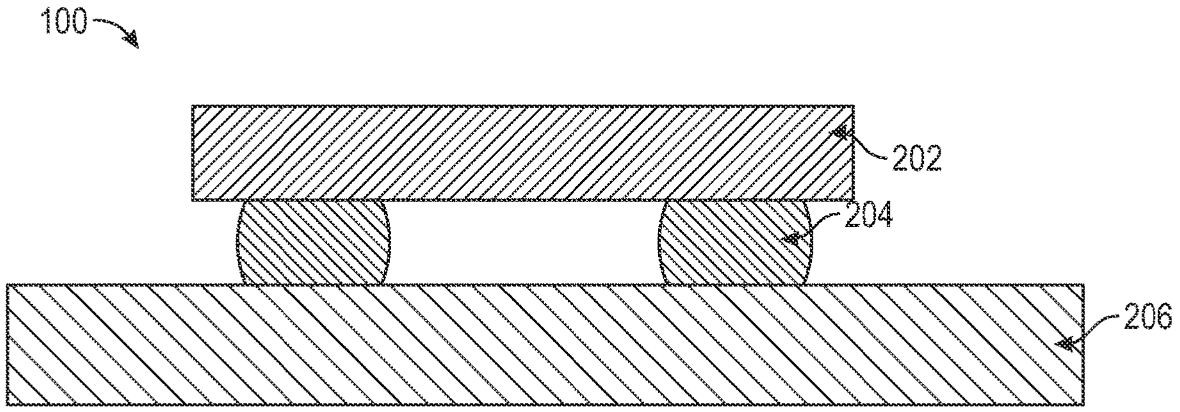
FIG. 2 is a diagram of the hybrid voting sensor system of FIG. 1 in a wafer level chip scale package (WLCSP) form, according to some embodiments.

Referring now to FIG. 2, hybrid sensor 100 is shown in a wafer level chip scale package (WLCSP), according to some embodiments. WLCSCP refers to a method of packing an IC as part of a wafer, rather than slicing the wafer into individual circuit for packing. As shown, the WLSCP form of hybrid sensor 100 includes a substrate 202, which may be formed of silicon (Si), gallium (GaAs), germanium (Ge), or any other suitable semiconductor. While not shown in FIG. 2, first sensing element 102 and second sensing element 104 may be integrated into, or disposed on, substrate 202. Further, in some embodiments, processing circuit 106 and decision logic 108 are also integrated into, or disposed on, substrate 202. In some such embodiments, one or more of first sensing element 102, second sensing element 104, processing circuit 106, and decision logic 108 are optionally integrated into a same side (e.g., the bottom side, or bottom face) of substrate 202.

Also shown to be disposed on the bottom face of substrate 202 are one or more solder bumps 204. As described herein, solder bumps 204 may be formed of any suitable alloy (e.g., including one or more of tin, copper, silver, bismuth, indium, zinc, etc.) for both electrically and mechanically coupling substrate 202, and thereby hybrid sensor 100, to a printed circuit board 206. As described herein, printed circuit board 206 can be formed of FR-4, polyimide, ceramic, or any other suitable material having electrical circuits disposed thereon. As an example, solder bumps may be formed of small balls of solder; however, it will be appreciated that, in other embodiments, metal pillars (e.g., copper, nickel, or other metal) may be used in place of solder bumps 204. Specifically, in some embodiments, solder bumps 204 may be replaced with one or more copper pillars that protrude from substrate 202. It should also be understood that the solder bumps and metal pillars are only provided as examples and that other types of electrical connectors can be used with the implementations described herein. In some embodiments, redistribution layers may also be disposed on the bottom side of substrate 202 to electrical couple substrate 202 to printed circuit board 206.

Figure 3:
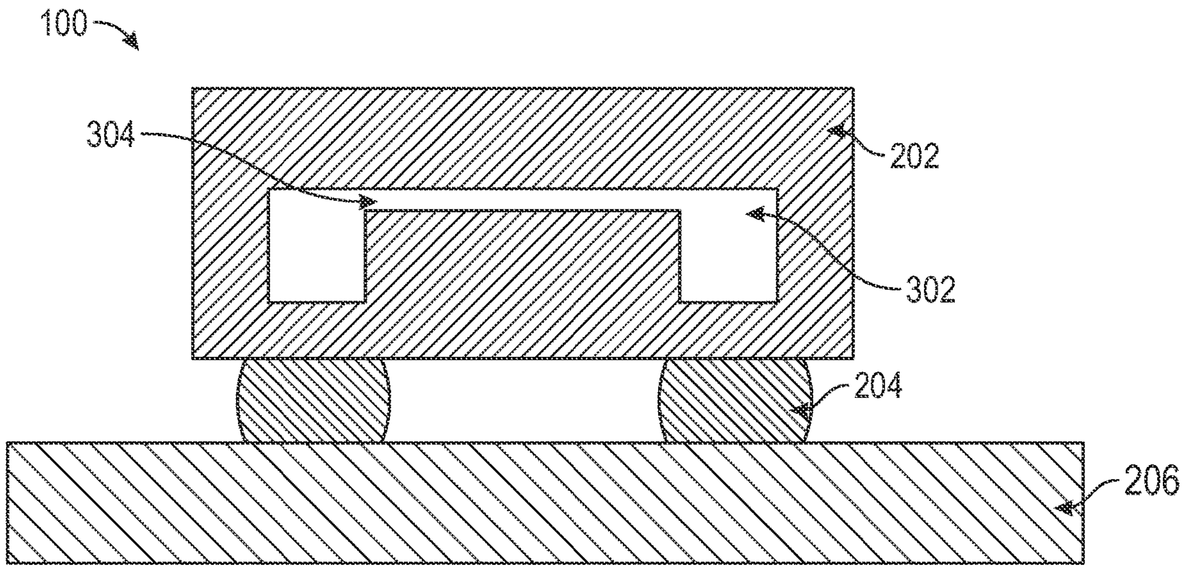
FIG. 3 is a diagram of the hybrid voting sensor system of FIG. 1 in wafer level chip scale package (WLCSP) form having a sealed cavity, according to some embodiments.

Referring now to FIG. 3, hybrid sensor 100 is shown in an alternate form of WLCSP having a sealed cavity 302, according to some embodiments. Similar to the WLSCP of hybrid sensor 100 described above with reference to FIG. 2, this alternate form of WLSCP form of hybrid sensor 100 includes substrate 202 onto which one or more of first sensing element 102, second sensing element 104, processing circuit 106, and decision logic 108 are disposed or integrated. Specifically, in some embodiments, first sensing element 102, second sensing element 104, processing circuit 106, and decision logic 108 are integrated on substrate 202, for example, into the bottom face of substrate 202. Also shown to be disposed on the bottom face of substrate 202 are one or more solder bumps 204, as described above, for both electrically and mechanically coupling substrate 202, and thereby hybrid sensor 100, to a printed circuit board 206

Unlike the embodiment of FIG. 2, however, the embodiment of hybrid sensor 100 shown in FIG. 3 includes sealed cavity 302. In some embodiments, sealed cavity 302 can also include overload protection 304, both of which are shown to be integrated into substrate 202. Example sensors having a sealed cavity are described in U.S. Pat. No. 9,902,611, issued Feb. 27, 2018 and entitled "Miniaturized and Ruggedized Wafer Level MEMS Force Sensors" and U.S. Pat. No. 10,466,119, issued Nov. 5, 2019 and entitled "Ruggedized Wafer Level MEMS Force Sensor with a Tolerance Trench," the disclosures of which are incorporated by reference in their entireties.

Advantageously, sealed cavity 302 and/or overload protection 304 may absorb and/or disperse at least a portion of an applied force in order to protect hybrid sensor 100, and more specifically to protect first sensing element 102, second sensing element 104, processing circuit 106, and decision logic 108 disposed on the bottom face of substrate 202. In other words, sealed cavity 302 may provide both overload and flexural protection for the various components of hybrid sensor 100. In some embodiments, sealed cavity 302 may be a hermetically sealed void having only air disposed therein. In some embodiments, sealed cavity 302 is vacuum sealed during manufacture.

Figure 4:
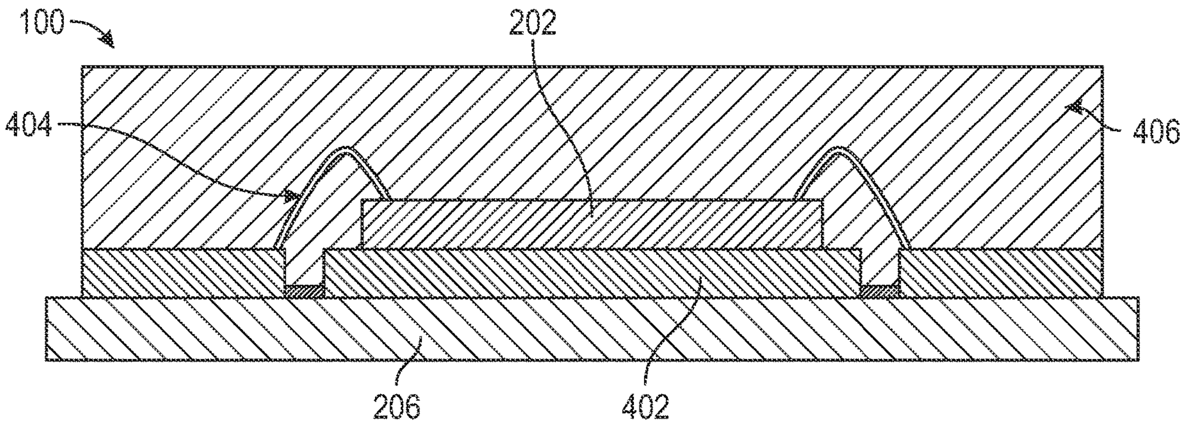
FIG. 4 is a diagram of the hybrid voting sensor system of FIG. 1 in a quad-flat no-leads package (QFP) form, according to some embodiments.

Referring now to FIG. 4, hybrid sensor 100 is shown in a quad-flat no-leads package (QFP), according to some embodiments. Like the various embodiments described above with respect to FIGS. 2 and 3, the embodiment of hybrid sensor 100 shown in FIG. 4 includes substrate 202 onto which one or more of first sensing element 102, second sensing element 104, processing circuit 106, and decision logic 108 are disposed or integrated. Specifically, in some embodiments, first sensing element 102, second sensing element 104, processing circuit 106, and decision logic 108 are integrated into the bottom face of substrate 202.

Disposed on the bottom face of substrate 202 is a lead frame 402. More specifically, lead frame 402 may be a metal frame for mechanically coupling substrate 202 to printed circuit board 206. Substrate 206 may further be electrically coupled to lead frame 402 through one or more bond wires 404. As described herein, bond wires 404 may be any form of any suitable, electrically conductive metal or metal alloy. Also shown in FIG. 4 is a molding compound 406 that encapsulates the substrate 202 and at least a portion of lead frame 404 and bond wires 406. For example, molding compound 406 may completely encapsulate at least the top side and side edges of substrate 202 and may cover at least the side of lead frame 402. However, it will be appreciated that, in some embodiments, molding compound may also encapsulate the side edges of lead frame 402. As described herein, molding compound 406 may be formed of any material or combination of materials that allows certain wavelengths of electromagnetic radiation (e.g., light) to pass through to substrate 202. In some embodiments, molding compound 406 is configured to allow the passage of light in the visible and/or near-infrared spectrum (e.g., 380-700 nm and 860-940 nm, respectively).

Figure 5:
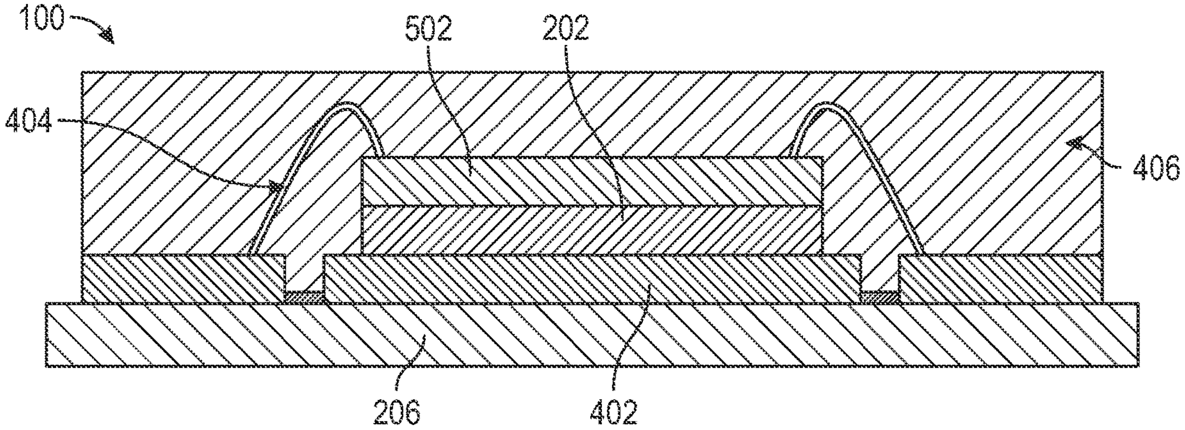
FIG. 5 is a diagram of the hybrid voting sensor system of FIG. 1 with an integrated piezoelectric machined ultrasound transducer (PMUT) in a QFP form, according to some embodiments.

Referring now to FIG. 5, hybrid sensor 100 is shown in an alternate QFP form having an integrated piezoelectric machined ultrasound transducer (PMUT), according to some embodiments. Like the various embodiments described above with respect to FIGS. 2, 3, and 4, the embodiment of hybrid sensor 100 shown in FIG. 5 includes substrate 202 onto which one or more of first sensing element 102, processing circuit 106, and decision logic 108 are disposed or integrated. Specifically, in some embodiments, first sensing element 102, processing circuit 106, and decision logic 108 are integrated into the bottom face of substrate 202. Additionally, in some such embodiments (e.g., the embodiment of hybrid sensor 100 shown in FIG. 5), second sensing element 104 is replaced with the PMUT. Specifically, in FIG. 5, the PMUT is shown as an ultrasonic transducer layer 502 (i.e., an acoustic actuator layer) disposed on a top side, or top face, of substrate 202. In other words, ultrasonic transducer layer 502 may by second sensing element 104 in certain embodiments. In such embodiments, as descried above, respective digital outputs for first sensing element 102 and ultrasonic transducer layer 502 can be used to validate intent.

This disclosure contemplates that first sensing element 102, processing circuit 106, and decision logic 108 can be integrated onto substrate 202 using a complementary metal-oxide-semiconductor (CMOS) process, which is well known in the art and therefore not described in further detail herein. In some embodiments, ultrasonic transducer layer 502 is disposed on substrate 202 through a post CMOS process. In other words, first sensing element 102, processing circuit 106, and decision logic 108 are integrated onto substrate 202 using CMOS process and thereafter the chip undergoes further processing to add ultrasonic transducer layer 502. In some embodiments, such as in the example of FIG. 5, ultrasonic transducer layer 502 is the same size as the silicon substrate 401. Specifically, in such embodiments, the surface area of ultrasonic transducer layer 502 may be equivalent to the surface area of substrate 202. In some embodiments, substrate 202 and ultrasonic transducer layer 502 are electrically coupled. In some such embodiments, a metal or metallic layer (not shown) is disposed between substrate 202 and ultrasonic transducer layer 502, which acts to electrically coupled said layers. For example, the metallic layer may be any electrically conductive metal or metal alloy (e.g., copper, aluminum, gold, etc.).

As shown, substrate 202 may also be disposed on top of lead frame 402, as described above with respect to FIG. 4. In some such embodiments, substrate 202 may be electrically coupled to lead frame 402 through bond wires 404, as also described above. However, unlike the embodiment shown in FIG. 4, in the embodiment of FIG. 5, substrate 202 is shown to be indirectly electrically coupled to lead frame 402. Specifically, bond wires 404 may extend from ultrasonic transducer layer 502 to lead frame 402; thus, as described above, substrate 202 may be indirectly electrically coupled to lead frame 402 via the electrical connection between substate 202 and ultrasonic transducer layer 502.

In some embodiments, molding compound 406 encapsulates the substrate 202 and at least a portion of lead frame 404, bond wires 406, and ultrasonic transducer layer 502. For example, molding compound 406 may completely encapsulate at least the top side and side edges of substrate 202 and/or ultrasonic transducer layer 502 and may cover at least the side of lead frame 402. However, it will be appreciated that, in some embodiments, molding compound may also encapsulate the side edges of lead frame 402. As described above, molding compound 406 may be formed of any material or combination of materials that allows certain wavelengths of electromagnetic radiation (e.g., light) to pass through to substrate 202. Additionally, or alternatively, in some embodiments, molding compound 406 can allow certain frequencies of sound to pass to substrate 202 and/or ultrasonic transducer layer 502. In some such embodiments, molding compound 406 may allow the passage of certain ultrasonic sound waves in the range of 1 MHz to 30 MHz.

Figure 6:
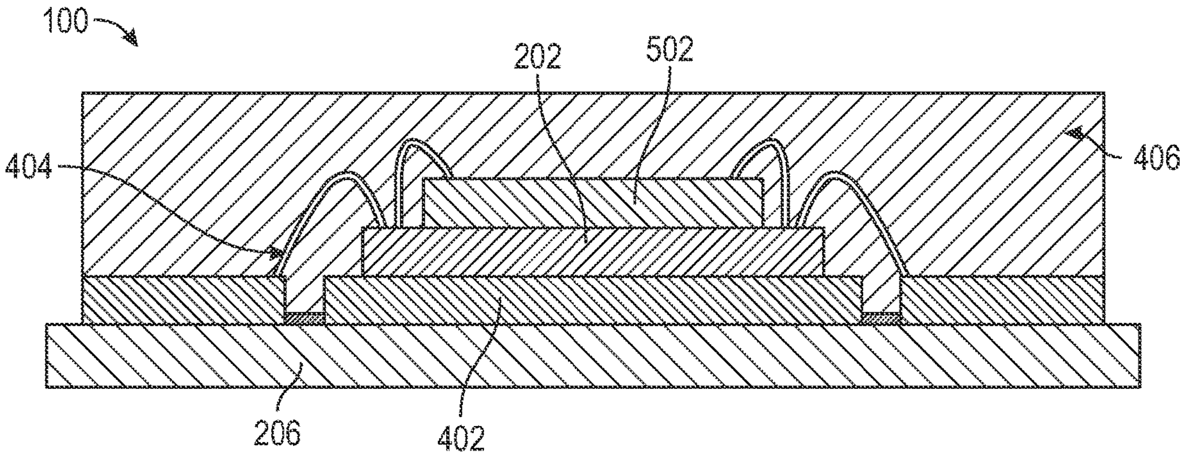
FIG. 6 is a diagram of the hybrid voting sensor system of FIG. 1 with an integrated PMUT in a stacked die in QFP form, according to some embodiments.

Referring now to FIG. 6, an alternate embodiment of hybrid sensor 100 in QFP form and having an integrated PMUT is shown, according to some embodiments. Like the various embodiments described above with respect to FIGS. 2, 3, 4, and 5, the embodiment of hybrid sensor 100 shown in FIG. 6 includes substrate 202 onto which one or more of first sensing element 102, processing circuit 106, and decision logic 108 are disposed or integrated. Specifically, in some embodiments, first sensing element 102, processing circuit 106, and decision logic 108 are integrated into the bottom face of substrate 202. Additionally, in some such embodiments (e.g., the embodiment of hybrid sensor 100 shown in FIG. 6), second sensing element 104 is replaced with the PMUT. Specifically, in FIG. 6, the PMUT is shown as an ultrasonic transducer layer 502 (i.e., an acoustic actuator layer) disposed on a top side, or top face, of substrate 202. In other words, ultrasonic transducer layer 502 may by second sensing element 104 in certain embodiments. In such embodiments, as descried above, respective digital outputs for first sensing element 102 and ultrasonic transducer layer 502 can be used to validate intent.

In some embodiments, ultrasonic transducer layer 502 is disposed on the top face of substrate 202 through a stacked die process. Additionally, unlike the embodiment shown in FIG. 5, as described above, the embodiment of FIG. 6 shows that ultrasonic transducer layer 502 may be smaller in size than substrate 202. Specifically, in such embodiments, the surface area of ultrasonic transducer layer 502 may be smaller than the surface area of substrate 202. As shown, substrate 202 may also be disposed on top of lead frame 402, as described above with respect to FIG. 4. In some such embodiments, substrate 202 may be electrically coupled to lead frame 402 through bond wires 404, as also described above. In some such embodiments, substrate 202 is indirectly electrically coupled to lead frame 402 though a metallic layer disposed between substrate 202 and ultrasonic transducer layer 502, as described above; although it will also be appreciated that substrate 202 may be electrically coupled directly to lead frame 402 through bond wires 404, as shown in FIG. 6. Additionally, in some embodiments, a second set of bond wires 404 may extend from ultrasonic transducer layer 502 to substrate 202 to electrically couple said layers.

In some embodiments, molding compound 406 encapsulates the substrate 202 and at least a portion of lead frame 404, bond wires 406, and ultrasonic transducer layer 502. For example, molding compound 406 may completely encapsulate at least the top side and side edges of substrate 202 and/or ultrasonic transducer layer 502 and may cover at least the side of lead frame 402. However, it will be appreciated that, in some embodiments, molding compound may also encapsulate the side edges of lead frame 402. As described above, molding compound 406 may be formed of any material or combination of materials that allows certain wavelengths of electromagnetic radiation (e.g., light) to pass through to substrate 202. Additionally, or alternatively, in some embodiments, molding compound 406 can allow certain frequencies of sound to pass to substrate 202 and/or ultrasonic transducer layer 502. In some such embodiments, molding compound 406 may allow the passage of certain ultrasonic sound waves in the range of 1 MHz to 30 MHz.

Configuration of Exemplary Embodiments

The present disclosure can be understood more readily by reference to the preceding detailed description, examples, drawings, and their previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The preceding description is provided as an enabling teaching. To this end, those skilled in the relevant art will recognize and appreciate that many changes can be made, while still obtaining beneficial results. It will also be apparent that some of the desired benefits can be obtained by selecting some of the features without utilizing other features. Accordingly, those who work in the art will recognize that many modifications and adaptations may be possible and can even be desirable in certain circumstances and are contemplated by this disclosure. Thus, the preceding description is provided as illustrative of the principles and not in limitation thereof.

As used throughout, the singular forms "a," "an" and "the" include plural referents unless the context clearly dictates otherwise. Thus, for example, reference to "a force sensor" can include two or more such force sensors unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps

What is claimed is:

1. A hybrid sensor device comprising:

a substrate;

a first sensing element configured to sense an applied force;

a second sensing element configured to sense at least one of light intensity, acoustic impedance, electrical conductivity, electrical permittivity, or temperature;

signal processing circuitry configured to receive and process respective output signals of the first and second sensing elements; and decision logic circuitry configured to validate an intent of a user input based on the respective output signals of the first and second sensing elements, wherein the first and second sensing elements, the signal processing circuitry, and the decision logic circuitry are integrated on the substrate wherein the validating the intent of the user input determines whether the user input was made by a user so that the user input is valid.

2. The hybrid sensor device of claim 1, wherein the second sensing element is a light sensor and wherein the at least one of light intensity, acoustic impedance, electrical conductivity, electrical permittivity, or temperature must include the light intensity.

3. The hybrid sensor device of claim 2, wherein the light sensor is configured to measure the light intensity of near-infrared light.

4. The hybrid sensor device of claim 1, wherein the at least one of light intensity, acoustic impedance, electrical conductivity, electrical permittivity, or temperature must include the acoustic impedance, wherein the acoustic impedance is an ultrasonic acoustic impedance and wherein the second sensing element is configured to measure the ultrasonic acoustic impedance.

5. The hybrid sensor device of claim 1, wherein the at least one of light intensity, acoustic impedance, electrical conductivity, electrical permittivity, or temperature must include at least one of the electrical conductivity and the electrical permittivity wherein the second sensing element is configured to measure the at least one of electrical conductivity and electrical permittivity using capacitance.

6. The hybrid sensor device of claim 1, wherein the first sensing element is at least one of a piezoelectric sensor, a piezoresistive sensor, or a capacitive sensor.

7. The hybrid sensor device of claim 1, wherein the hybrid sensor device is implemented as a wafer level chip scale package (WLCSP).

8. The hybrid sensor device of claim 7, further comprising at least one of a plurality of solder bumps or a plurality of copper pillars protruding from the substrate for electrically and mechanically coupling the hybrid sensor device to a printed circuit board.

9. The hybrid sensor device of claim 1, wherein the hybrid sensor device is implemented as a quad-flat no-leads (QFN) package.

10. The hybrid sensor device of claim 9, further comprising a metal lead frame, wherein the substrate is disposed on the metal lead frame and wherein the substrate and the metal lead frame are electrically coupled using a bond wire.

11. The hybrid sensor device of claim 1, further comprising a sealed cavity formed in the substrate to provide flexural and overload protection.

12. The hybrid sensor device of claim 1, further comprising an acoustic actuator layer formed on top of the substrate wherein the at least one of light intensity, acoustic impedance, electrical conductivity, electrical permittivity, or temperature must include the acoustic impedance wherein the second sensing element is configured to measure the acoustic impedance of the acoustic actuator layer.

13. The hybrid sensor device of claim 12, further comprising a metallic layer positioned between the acoustic actuator layer and the substrate, wherein the acoustic actuator layer and the substrate are electrically coupled through the metallic layer.

14. The hybrid sensor device of claim 12, wherein the acoustic actuator layer is electrically coupled to the substrate through a bond wire.

15. The hybrid sensor device of claim 12, wherein the acoustic actuator layer is smaller in surface area than the substrate.

16. The hybrid sensor device of claim 12, wherein the acoustic actuator layer is equivalent in surface area to the substrate.

* * * * *